(12) United States Patent
Wodrich

(10) Patent No.: US 8,469,465 B2
(45) Date of Patent: Jun. 25, 2013

(54) BOGIE UNDERCARRIAGE DESIGN WITH RIGIDLY MOUNTED TRACK ROLLER

(75) Inventor: Timothy D. Wodrich, Reiles Acres, ND (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/098,000

(22) Filed: Apr. 29, 2011

(65) Prior Publication Data

US 2012/0274129 A1    Nov. 1, 2012

(51) Int. Cl.
*B62D 55/14* (2006.01)
*B62D 55/104* (2006.01)

(52) U.S. Cl.
USPC .......................... 305/133; 305/132; 305/129

(58) Field of Classification Search
USPC .............. 305/120, 124, 125, 127, 128, 129, 305/130, 131, 132, 133, 134, 142; 180/9.1, 180/9.54
See application file for complete search history.

(56) References Cited

U.S. PATENT DOCUMENTS

| | | | |
|---|---|---|---|
| 5,749,423 A * | 5/1998 | Burckhartzmeyer et al. | 180/9.54 |
| 6,364,437 B1 * | 4/2002 | Phely | 305/116 |
| 6,607,256 B2 * | 8/2003 | Yoshida et al. | 305/132 |
| 6,702,406 B2 * | 3/2004 | Yoshida et al. | 305/100 |
| 7,014,278 B2 * | 3/2006 | Yoshida et al. | 305/132 |
| 7,025,429 B2 * | 4/2006 | Yoshida et al. | 305/132 |
| 7,249,641 B2 * | 7/2007 | Dommert et al. | 180/9.1 |
| 7,862,131 B2 * | 1/2011 | Poirier | 305/134 |
| 8,083,014 B1 * | 12/2011 | Hall | 180/9.1 |
| 8,157,335 B2 * | 4/2012 | Poirier | 305/134 |
| 2005/0077784 A1 * | 4/2005 | Dudzinski et al. | 305/127 |

\* cited by examiner

*Primary Examiner* — Kip T Kotter

(57) ABSTRACT

An undercarriage is disclosed that includes a rigidly mounted track roller near or adjacent to a rear drive sprocket, with the outer radius of the track roller overlapping the outer radius of the drive sprocket. The remaining rollers and bogies may be flexibly suspended.

8 Claims, 4 Drawing Sheets

BOGIE UNDERCARRIAGE DESIGN WITH RIGIDLY MOUNTED TRACK ROLLER

FIELD OF THE INVENTION

This disclosure relates to track rollers for undercarriage bogies and, more particularly, to rigidly mounted track rollers.

BACKGROUND OF THE INVENTION

It is conventional to provide undercarriage track rollers and bogies with suspension elements to absorb shock and improve weight distribution as exemplified in U.S. Pat. No. 7,025,429 (see FIG. 5). As illustrated in FIG. 5, one end of the track frame 1 is provided with a yoke 1a to a distal end of which a track idler 2 is rotatably mounted. A sprocket wheel 3 is rotatably mounted on a vehicle body (not shown) in the vicinity of an opposite end portion of the track frame 1. A plurality of track rollers 11, 12, 43, and 47 are attached in individually rocking manners to a lower portion of the track frame 1 between the idler 2 and the sprocket 3. An endless track chain 6 is trained about the idler 2, sprocket 3 and track rollers 11, 12, 43, and 47. Below the track frame 1 at a location adjacent the idler 2 is a roller unit 40a including an arm 41 having a forward end portion attached to the track frame 1 for rocking vertically about a pin 42. On abutment portions of an upper portion of the arm 41 and a lower location of the track frame 1, respectively, there is mounted elastic members 44a and 44b which abut against each other to restrict upward movement of the arm 41 and to bear the load applied to the track roller 43 to absorb the impact, which might otherwise be received by the track roller 43. Similarly, mounted below the track frame 1 adjacent to sprocket 3 there is a single track roller unit 40b including an arm 45 having its proximal end portion vertically pivotally attached to the lower portion of the track frame 1 for being rocked about a pin 46. Respectively mounted on an upper rear end portion of the arm 45 and a lower portion of the track frame 1 are elastic members 48a and 48b which abut against each other to limit upward pivoting of the arm 45 and to bear the load applied to the track roller 47 to thereby absorb the impact, which might otherwise be received by the track roller 47. In addition, a predetermined number of double track roller units 10 are disposed below the track frame 1 between the track rollers 43 and 47, with each roller unit 10 including a first arm 31 having a proximal end portion attached to the lower portion of the track frame 1 for being rocked vertically on a first pin 33, and a second arm 32 having a central portion mounted to the distal end portion of the first arm 31 for being vertically rocked about a second pin 35. Elastic members 34a and 34b are respectively mounted to the upper portion of the first arm 31 and the lower portion of the frame 1 so that they abut each other and act to restrict upward pivotal movement of the arm 31 and bear the load applied to the lower rollers 11 and 12 to thereby absorb the impact which might otherwise be transferred to the roller 11 and 12. Thus, the roller 43 adjacent the idler 2, the rollers 11 and 12 of the double track roller units 10 and the roller 47 adjacent to the drive sprocket 3 are all suspended. This practice, when extended to track roller adjacent to the drive sprocket, can lead to damage and avoidable wear of the drive sprocket. Further, under load conditions, the rear drive sprocket pulls on the track to propel the crawler in a forward direction, drawing the track taut and, essentially, negating the need for the roller nearest the drive sprocket to be provided with costly suspension.

SUMMARY OF THE INVENTION

Disclosed herein is an undercarriage that may include a rigidly mounted roller near or adjacent to a rear drive sprocket. The remaining rollers and bogies may be flexibly suspended. Comparatively, the rigidly mounted roller may, among other things, serve to improve vehicular weight distribution across the track, reduce the number of parts in the undercarriage, increase protection from debris entering the tooth area of the drive sprocket and reduce ground or shock loads to the final drive.

BRIEF DESCRIPTION OF THE DRAWINGS

FIG. 5 is a side view of a prior art undercarriage as disclosed in U.S. Pat. No. 7,025,429.

DESCRIPTION OF THE PREFERRED EMBODIMENT

Figure 1:
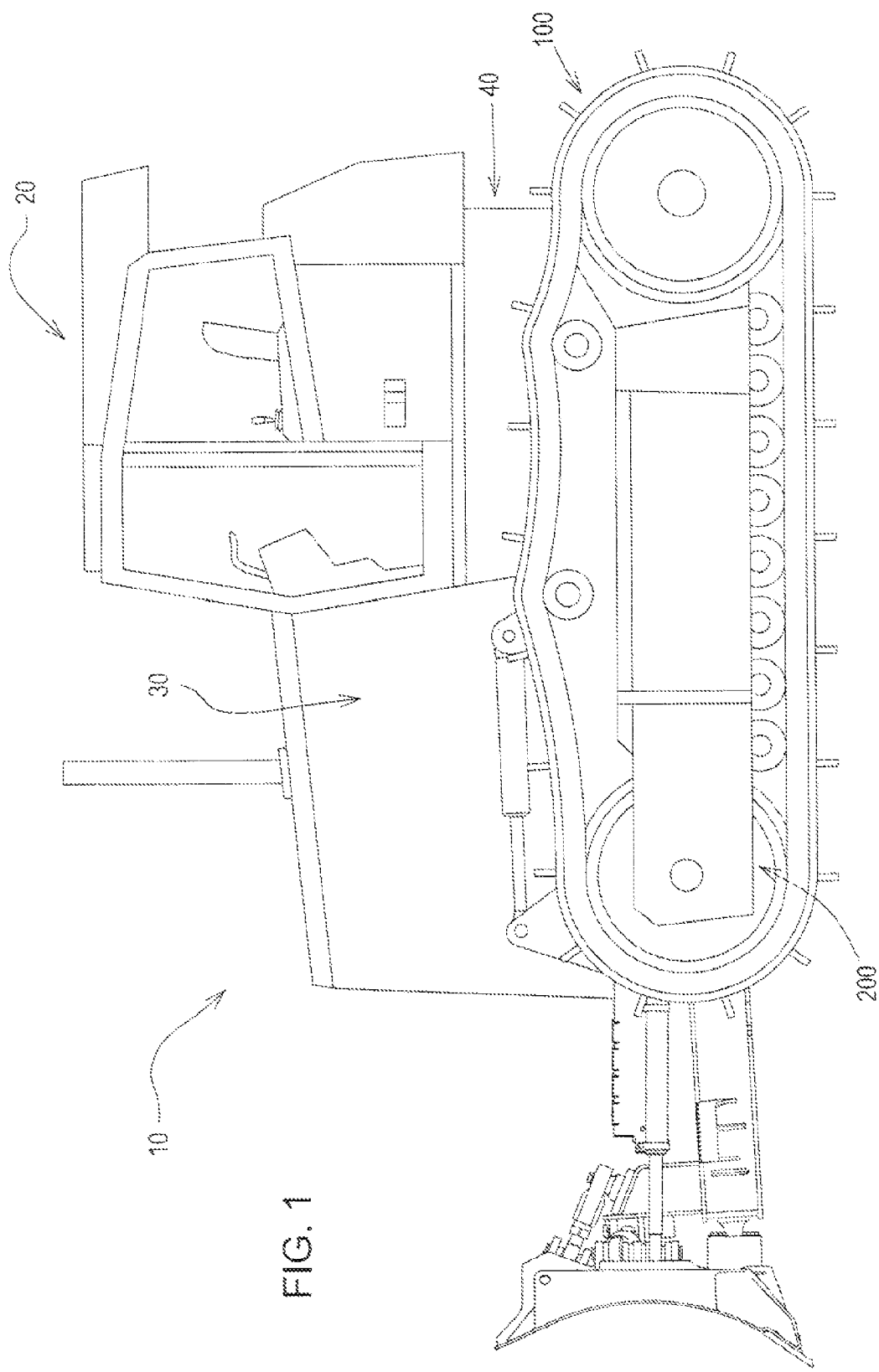
FIG. 1 is an illustration of a vehicle that may make use of the invention.

FIG. 1 is an illustration of a work vehicle in which the invention may be utilized. The dozer 10 illustrated, includes a cab 20, a body 30, a main frame 40, and an undercarriage 100.

Figure 2:
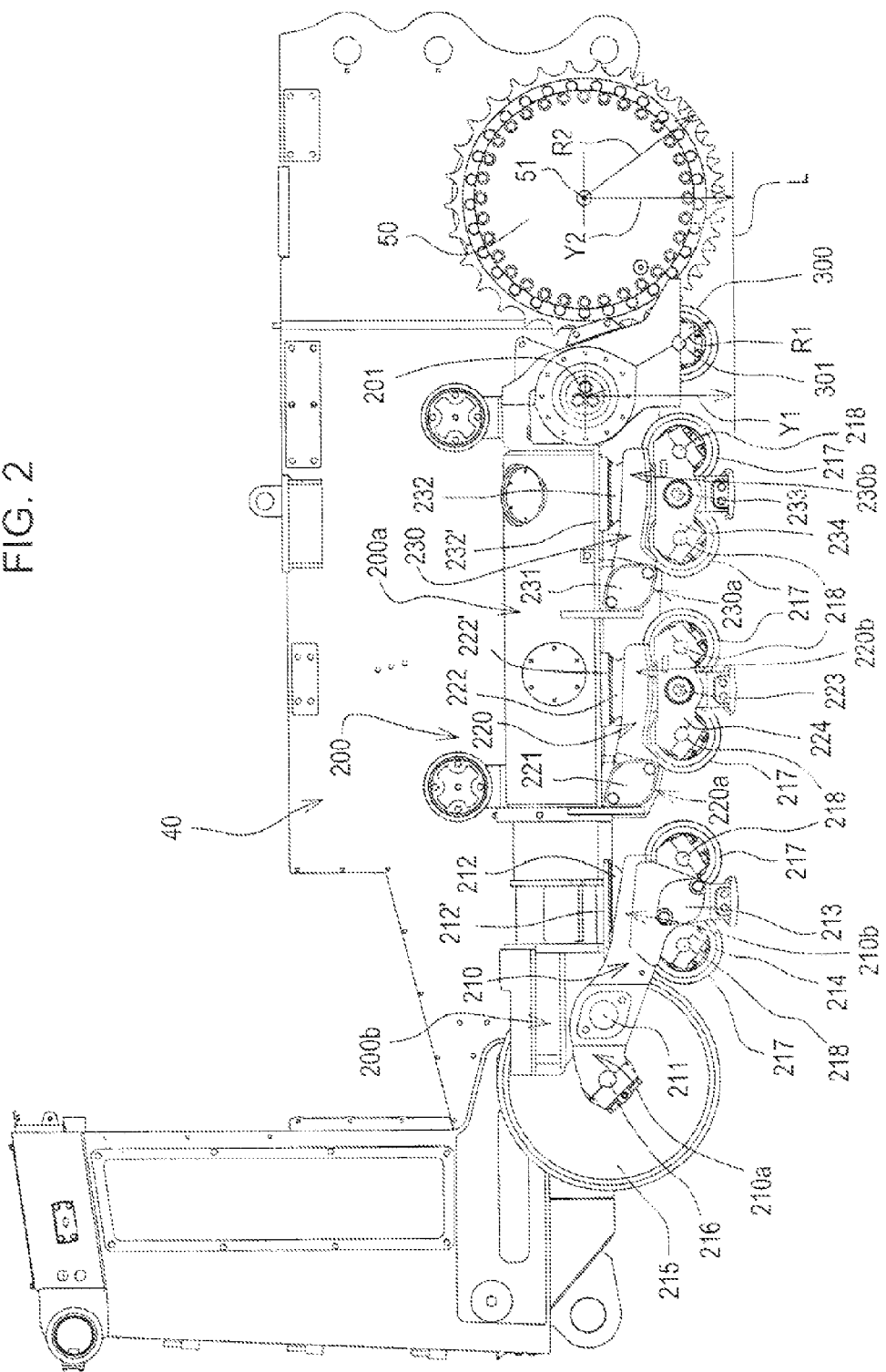
FIG. 2 is a side view of a frame and a portion of an undercarriage making use of the invention.
Figure 3:
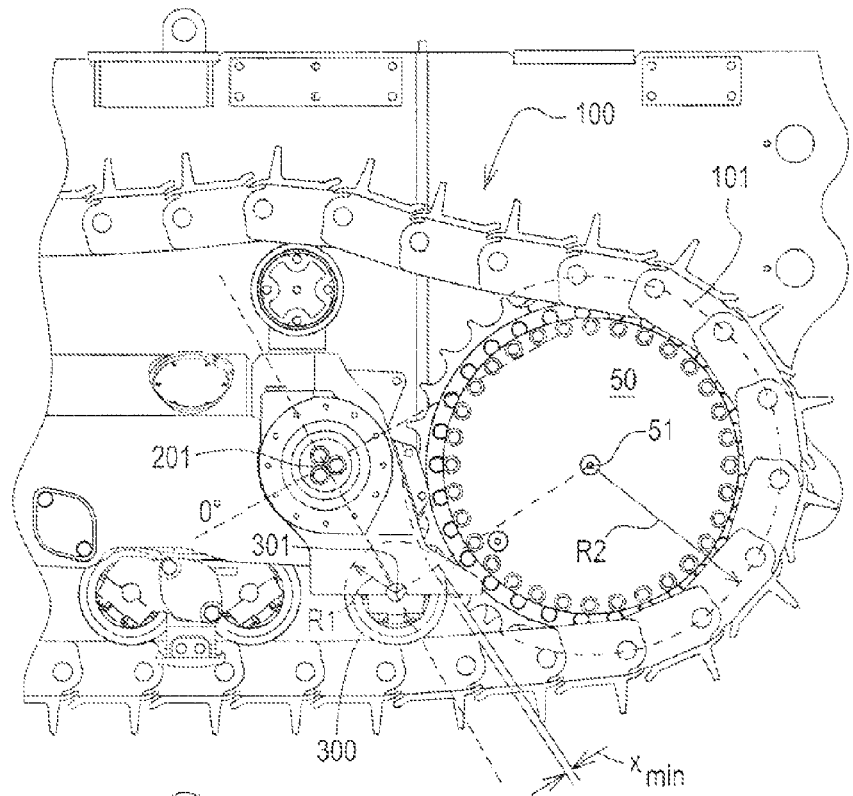
FIG. 3 is a side view of a portion of the undercarriage that is not rotated with respect to the frame.
Figure 4:
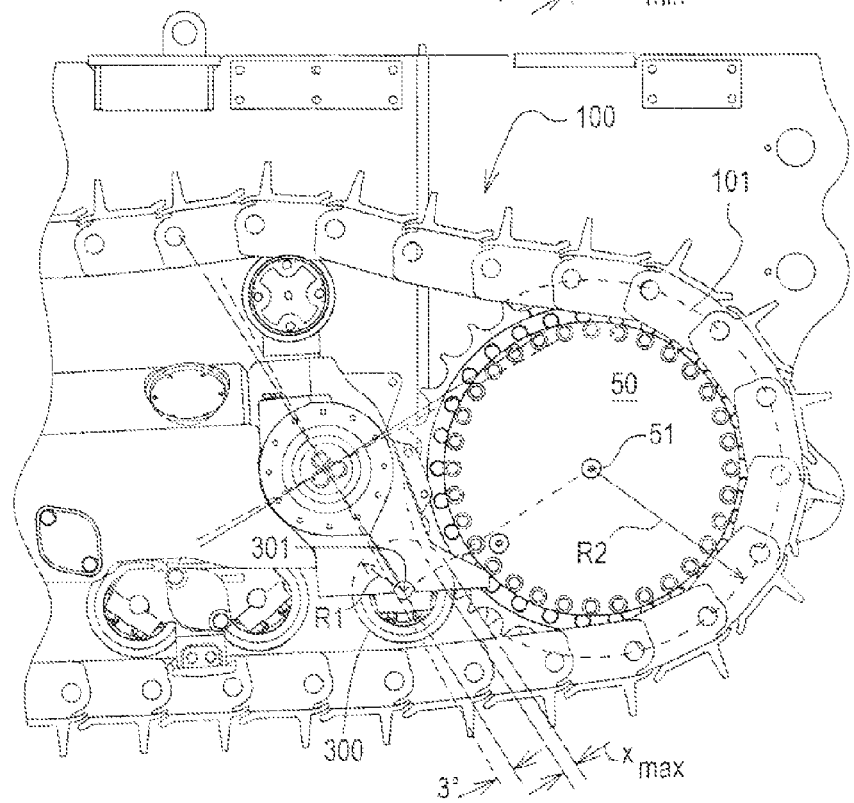
FIG. 4 is a side view of the portion of the undercarriage of FIG. 3 that is rotated with respect to the frame.
Figure 5:
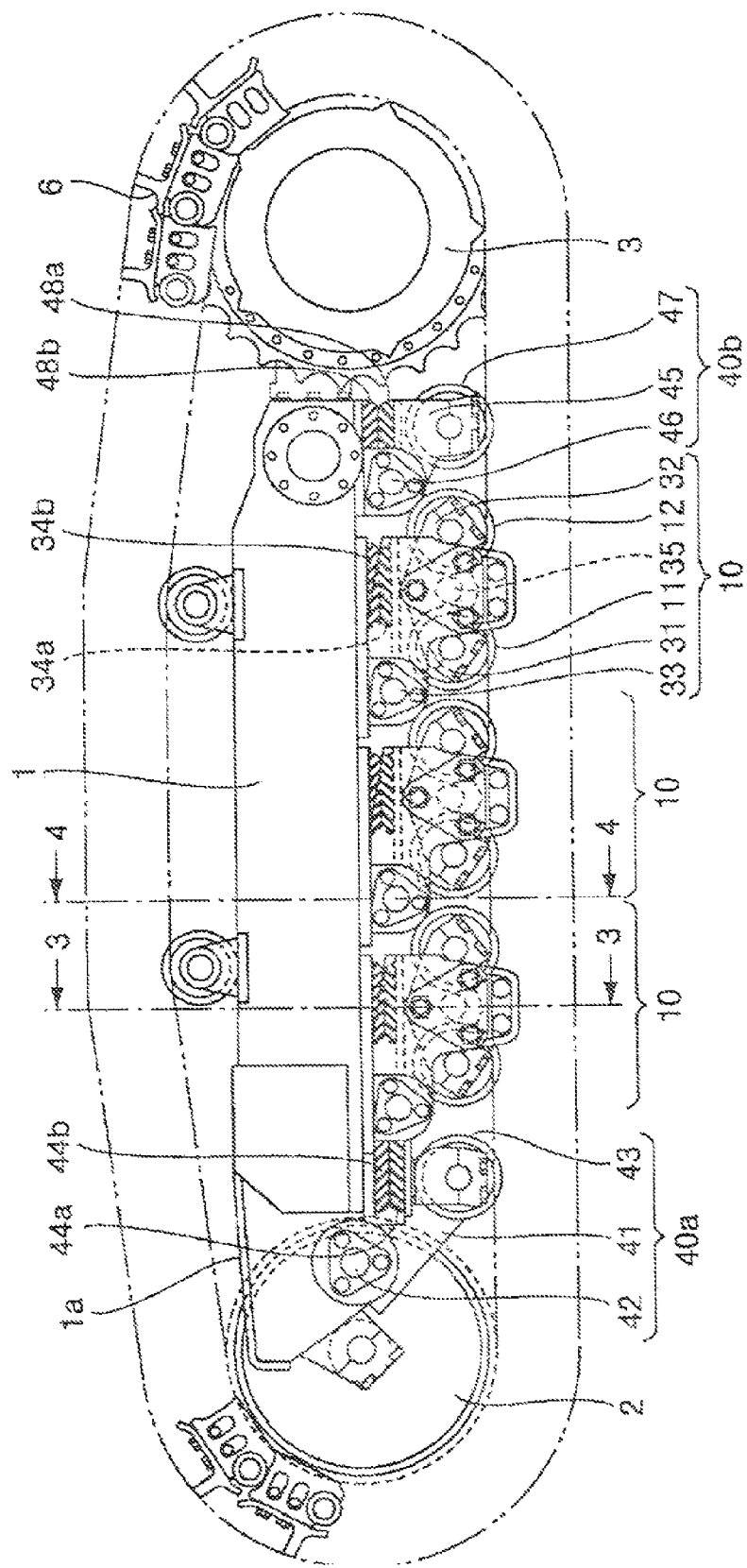
FIG. 5 is a side view of the undercarriage.

FIG. 2 illustrates a side view of a portion of the undercarriage 100 as well as a portion of the main frame 40 and a rear drive sprocket 50 rigidly attached to the main frame 40 via a gearbox (not shown). As illustrated, the undercarriage 100 includes: a track frame assembly 200 having a first or stationary portion 200a and a second or moving portion 200b; an idler bogie arm 210 pivotally attached to the moving portion 200b at pivot point 211; an idler 215, rotationally attached to a first end 210a of the idler bogie arm 210 at 216; a first flexible pad 212 attached to a second end 210b of the idler bogie arm 210; a first minor bogie arm 214, pivotally attached at the second end 210b of the idler bogie arm 210 at pivot axis 213. Also illustrated is a first roller bogie arm 220 pivotally attached at a first end 220a to the stationary portion 200a at pivot shaft 221; a second flexible pad 222 attached to a second end 220b of the first roller bogie arm 220; a second minor bogie arm 224, pivotally attached to the second end 220b of the first roller bogie arm 220 at pivot axis 223. The illustration further includes a second roller bogie arm 230 pivotally attached, at a first end 230a to the stationary portion 200a at pivot shaft 231; a third flexible pad 232 attached to a second end 230b of the second roller bogie arm 230; a third minor bogie arm 234, pivotally attached to the second roller bogie arm 230 at pivot shaft 233. Two rollers 217 are rotationally attached to each of the minor bogie arms 214, 224 and 234 in a conventional manner and rotate about their respective axes 215'. The flexible pads 212, 222 and 232 may be made of an elastomeric material and may be conventionally attached to the idler bogie arm 210 and the first and second roller bogie arms 220, 230 and the stationary portion as described. Stationary flexible pads 212', 222' and 232' may be similarly attached to the stationary portion 200a of the track frame assembly 200 and positioned such that contact is maximized with their respective mating flexible pads 212, 222 and 232 as the second ends 210b, 220b and 230b move closer to the stationary portion 200a. Additionally, the flexible pads 212', 222' and 232' may also be made of an elastomeric material. As illustrated, a fixed roller 300, which is the same in size and construction as the rollers 217, is rotationally attached to the track frame assembly 200 at fixed roller rotational axis 301 where the fixed roller rotational axis 301 is rigidly located with respect to the track frame assembly 200. As shown in FIGS. 3 and 4, the undercarriage 100 also includes a track chain 101. Note that only one track frame assembly 200 is illustrated in the Figures, with the track frame assembly 200 on the other side of the vehicle 10 being an identical reflection of the illustrated track frame assembly 200.

As illustrated in FIGS. 2, 3 and 4, the track frame assembly 200 and the main frame 40 are pivotally connected together via a pivot shaft 201. As illustrated, a drive sprocket 50 may be rotationally connected to the main frame 40 via a final drive (not shown) and conventional housing structure (not specifically illustrated) and may rotate about an axis 51 having a fixed location with respect to the main frame 40. The track frame assembly 200 may be slidably connected to a support bar (not illustrated). The support bar (not illustrated) may be pivotally connected to the main frame 40 midway between the track frame assemblies 200 at the opposite sides of the undercarriage 100 and may limit the angular range of rotation for each track frame assembly 200 about the pivot shaft 201 to a maximum angular range of, for example, ±3°.

As the vehicle moves along irregular areas of the ground, the roller bogie arms 220, 230 as well as the idler bogie arm 210 may pivot upon their respective axes 221, 231 and 211 in accordance with the demands of the terrain and the weight of the vehicle 10. Additionally, attached rollers 217 rotate about their respective axes 218 and the minor bogie arms 214, 224, 234 pivot about their respective axes 213, 223, 233 to accommodate irregularities as the weight of the vehicle 10 causes the track chain 101 to bend and conform to the contours of the ground.

As illustrated in FIG. 2, the fixed roller 300 does not flex, with respect to the track frame assembly 200, to accommodate the contours of the ground as it has an axis 301 that is rigidly fixed with respect to the track frame assembly 200. Additionally, the fixed roller 300 is placed as close as practicable to the drive sprocket 50. In fact, it can be seen that when the work vehicle is on level ground, as indicated by a reference line L, and outer radius R1 of the fixed roller 300 overlaps an outer radius R2 of the sprocket 50 by a distance $X_{min}$ (see FIG. 3), with it being noted that this outer radius of the fixed roller 300 is defined by an end rim portion which overlaps the track chain 101. The proximity of the fixed roller 300 to the drive sprocket 50 results in the fixed roller 300 preventing a significant amount of debris from reaching the drive sprocket as the fixed roller will tend to crush and remove such debris prior to its contact with the drive sprocket 50. The fixed roller 300 also acts to reduce the amount of weight and shock loading borne by the drive sprocket 50 because it is able to bear a substantial portion of any load in that location, including a weight of the track frame assembly 200, due to its proximity to the drive sprocket 50.

As illustrated in FIG. 2, the horizontal reference line L extends beneath an axis of the pivot shaft 201 and the drive sprocket axis 51, with the pivot shaft 201 being spaced from the reference line L by a distance Y1 and the drive sprocket rotational axis 51 being spaced from the line L by a distance Y2 and thus they are approximately equidistant from the ground, i.e., Y1≈Y2. Such an arrangement allows a minimal distance between the fixed roller 300 and the drive sprocket 50 and results in improved weight distribution as described above.

FIG. 4 illustrates the track frame assembly 200 at a maximum angular position of 3° with respect to the main frame 40, i.e., 3° in a direction that reduces the distance between the roller 300 and the sprocket 50 thereby increasing the overlap between the outer radius R1 of the fixed roller 300 and the outer radius R2 of the drive sprocket 50. (Note: FIGS. 2 and 3 show the track frame at an angular position of 0° with respect to the main frame. FIG. 2 illustrates R1 and R2.) In this exemplary embodiment of the invention, a maximum overlap distance $X_{max}$ $X_{min}$, as shown in FIG. 4, exists between the roller radius R1 and the sprocket radius R2, at the maximum angular position illustrated, for non-interference between the fixed roller 300 and the drive sprocket 50. Thus, the track frame assembly 200, the main frame 40 and the drive sprocket 50 may be designed such that the maximum overlap distance $X_{max}$ between the outer radius R1 of the roller 300 and the outer radius R2 of the sprocket 50 occurs at the maximum angular position of 3°. Such a design results in the minimum practicable overlap distance $X_{min}$ between R1 and R2 at an angular position of 0°.

As described above and illustrated in FIGS. 3 and 4, the fixed roller rotational axis 301 moves with respect to the drive sprocket rotational axis 51 whenever the track frame assembly 200 rotates with respect to the main frame 40 about pivot shaft 201. As described earlier rotational movement between the track frame assembly 200 and the main frame 40 for this exemplary embodiment may be restricted to a predetermined angular range of, for example, ±3°. Thus, in order to place the fixed roller 300 as close as practicable to the drive sprocket 50, the fixed roller 300 may be placed such that it avoids interference with the movement of the drive sprocket 50 when the relative angle between the main frame 40 and the track frame assembly 200 is at its maximum (e.g., 3°) in a direction that reduces the distance between the fixed roller 300 and the drive sprocket 50.

Having described the preferred embodiment, it will become apparent that various modifications can be made without departing from the scope of the invention as defined in the accompanying claims.

The invention claimed is:

1. An undercarriage comprising:
   a main frame;
   a track frame assembly mounted to the main frame for pivoting vertically;
   an idler bogie arm pivotally attached to the track frame assembly for moving vertically;
   an idler rotationally attached to the idler bogie arm;
   a roller bogie arm pivotally attached to the track frame assembly;
   a minor bogie arm pivotally attached to the roller bogie arm;
   a roller rotationally attached to the minor roller bogie arm;
   a drive sprocket located in fore-and-aft alignment with the track frame assembly and being fixed to the main frame for rotation about a sprocket axis of rotation; and
   a fixed track roller being in fore-and-aft alignment with, and being located adjacent to, the drive sprocket and rotationally attached to an axe rigidly mounted to the track frame, the fixed track roller having an outer radius overlapping an outer radius of the drive sprocket and being located for at least partially supporting a weight of the track frame assembly.

2. The undercarriage of claim 1, wherein said main frame further includes a main frame pivot shaft upon which the track frame assembly pivots in opposite directions from a horizontal position relative to the main frame, the main frame pivot shaft having an axis.

3. The undercarriage of claim 2 wherein the drive sprocket axis of rotation and the axis of the main frame pivot shaft are respectively at approximately equal vertical distances from a bottom of the track frame assembly, when the track frame assembly is in said horizontal position.

4. The undercarriage of claim 3 wherein a maximum angle by which the track frame assembly pivots relative to the main frame assembly is approximately 3° in said opposite directions from the horizontal position.

5. The undercarriage of claim 3, wherein the amount of overlap between the outer radius of the fixed track roller and the outer radius of the drive sprocket when the track frame assembly is in the horizontal position is within a range which results in the outer radius of the sprocket clearing the fixed track roller at a maximum relative angle between the track frame assembly and the main frame.

6. The work vehicle of claim 3, wherein the predetermined rotational limit does not exceed a range of ±3 degrees of angle from said horizontal position.

7. A work vehicle having a ground supported undercarriage comprising:
- a main frame having a rear pivot shaft;
- a track frame assembly pivotally attached to the main frame at the rear pivot shaft, the track frame assembly having a predetermined rotational limit in opposite directions from a horizontal position about said pivot shaft;
- an idler bogie arm pivotally attached to the track frame assembly;
- an idler rotationally attached to a first end of the idler bogie arm;
- a roller bogie arm pivotally attached to the track frame assembly;
- a minor bogie arm pivotally attached to the roller bogie arm;
- a track roller being rotationally attached to the minor bogie arm;
- a rear drive sprocket located in fore-and-aft alignment with said idler and having an axis of rotation, which is fixed relative to said main frame, the drive sprocket being mounted to the main frame for rotation about said axis of rotation;
- a track chain extending about said idler and said drive sprocket; and
- a rear track roller being mounted to the track frame assembly for rotation about a roller axis located such that the rear track roller is in fore-and-aft alignment with, and adjacent to, the rear drive sprocket and the roller axis being fixed with respect to the track frame, the drive sprocket having an outer radius overlapping an outer radius of, and clearing the rear track roller when the track frame has been rotated to the predetermined rotational limit in a direction that reduces the distance between the rear track roller and the rear drive sprocket.

8. The work vehicle of claim 7, wherein the axis of rotation and the rear pivot axis are at approximately equal vertical distances from a horizontal reference line passing through the track chain on a side of the undercarriage where both the rear track roller and the rear drive sprocket physically contact the track chain and when the track frame assembly is in the horizontal position.

* * * * *